(12) United States Patent
Provancher

(10) Patent No.: US 8,326,462 B1
(45) Date of Patent: Dec. 4, 2012

(54) TACTILE CONTACT AND IMPACT DISPLAYS AND ASSOCIATED METHODS

(75) Inventor: William R. Provancher, Salt Lake City, UT (US)

(73) Assignee: University of Utah Research Foundation, Salt Lake City, UT (US)

(*) Notice: Subject to any disclaimer, the term of this patent is extended or adjusted under 35 U.S.C. 154(b) by 938 days.

(21) Appl. No.: 12/402,067

(22) Filed: Mar. 11, 2009

Related U.S. Application Data

(60) Provisional application No. 61/069,235, filed on Mar. 12, 2008.

(51) Int. Cl.
G06F 3/01 (2006.01)
G08B 6/00 (2006.01)
G06F 3/03 (2006.01)
A63F 13/02 (2006.01)

(52) U.S. Cl. ....................................................... 700/264

(58) Field of Classification Search .................. 116/205; 340/407.1–407.2; 345/156, 173–178; 414/1–7; 434/112–115, 117; 700/245–264; 901/1–50
See application file for complete search history.

(56) References Cited

U.S. PATENT DOCUMENTS

| | | | |
|---|---|---|---|
| 4,540,979 A | 9/1985 | Gerger et al. | |
| 5,028,093 A | 7/1991 | Nason | |
| 5,184,319 A * | 2/1993 | Kramer | 703/5 |
| 5,261,266 A | 11/1993 | Lorenz et al. | |
| 5,273,384 A | 12/1993 | Dunbar | |
| 5,451,924 A * | 9/1995 | Massimino et al. | 340/407.1 |
| 5,587,937 A | 12/1996 | Massie et al. | |
| 5,589,828 A | 12/1996 | Armstrong | |
| 5,625,576 A | 4/1997 | Massie et al. | |
| 5,694,013 A | 12/1997 | Stewart et al. | |
| 5,709,219 A * | 1/1998 | Chen et al. | 600/595 |
| 5,752,795 A | 5/1998 | D'Adamo | |
| 5,765,791 A | 6/1998 | Givonetti | |
| 5,767,796 A | 6/1998 | Van Roekel et al. | |
| 5,786,997 A | 7/1998 | Hoyt et al. | |

(Continued)

FOREIGN PATENT DOCUMENTS

JP 2005 129044 5/2005

(Continued)

OTHER PUBLICATIONS

Provancher, U.S. Appl. No. 12/182,906, filed Jul. 30, 2008.

(Continued)

Primary Examiner — Khoi Tran
Assistant Examiner — Dale Moyer
(74) Attorney, Agent, or Firm — Thorpe North & Western LLP

(57) ABSTRACT

A tactile contact and impact display system comprises a receiver, operable to receive therein a user's digit while leaving a target area of skin of the user's digit at least partially exposed. A contact pad is operable to engage the target area of the user's skin. An actuation system is actuatably coupled to the contact pad and is operable to move the contact pad relative to the target area of skin. A distance sensor is coupled to the contact pad, the distance sensor being operable to sense a separation distance between the contact pad and the target area of the user's digit. A restraining system is operable to substantially restrain the contact pad from moving in at least one degree of freedom relative to the receiver while allowing the contact pad to move in at least one degree of freedom relative to the receiver.

20 Claims, 2 Drawing Sheets

U.S. PATENT DOCUMENTS

| | | | |
|---|---|---|---|
| 5,898,599 A | 4/1999 | Massie et al. | |
| 5,982,696 A | 11/1999 | Rao | |
| 6,042,555 A * | 3/2000 | Kramer et al. | 600/595 |
| 6,135,691 A | 10/2000 | Nadarajah et al. | |
| 6,158,933 A | 12/2000 | Nicholson | |
| 6,184,868 B1 | 2/2001 | Shahoian et al. | |
| 6,208,328 B1 | 3/2001 | Kawachiya et al. | |
| 6,236,306 B1 | 5/2001 | Liebelt | |
| 6,246,391 B1 | 6/2001 | Ong | |
| 6,388,655 B1 | 5/2002 | Leung | |
| 6,417,638 B1 | 7/2002 | Guy et al. | |
| 6,418,362 B1 | 7/2002 | St. Pierre et al. | |
| 6,494,658 B1 | 12/2002 | Roy | |
| 6,535,806 B2 | 3/2003 | Millsap et al. | |
| 6,565,059 B1 | 5/2003 | Falconer | |
| 6,691,972 B1 | 2/2004 | Oliver | |
| 6,693,622 B1 | 2/2004 | Shahoian et al. | |
| 6,697,044 B2 | 2/2004 | Shahoian et al. | |
| 6,703,999 B1 | 3/2004 | Iwanami et al. | |
| 6,788,999 B2 | 9/2004 | Green | |
| 6,793,234 B2 | 9/2004 | Carlstedt et al. | |
| 6,808,350 B1 | 10/2004 | Tooman et al. | |
| 6,859,819 B1 | 2/2005 | Rosenberg et al. | |
| 6,930,590 B2 | 8/2005 | Ling et al. | |
| 6,961,644 B2 | 11/2005 | Mercier et al. | |
| 6,982,696 B1 | 1/2006 | Shahoian | |
| 6,995,745 B2 | 2/2006 | Boon et al. | |
| 7,077,015 B2 | 7/2006 | Hayward et al. | |
| 7,084,854 B1 | 8/2006 | Moore et al. | |
| 7,196,688 B2 | 3/2007 | Schena | |
| 7,209,118 B2 | 4/2007 | Shahoian et al. | |
| 7,215,320 B2 | 5/2007 | Takeuchi et al. | |
| 7,242,112 B2 | 7/2007 | Wolf et al. | |
| 7,333,088 B2 | 2/2008 | Boon et al. | |
| 7,339,574 B2 | 3/2008 | Kyung et al. | |
| 7,450,110 B2 | 11/2008 | Shahoian et al. | |
| 7,603,214 B2 | 10/2009 | Tanaka et al. | |
| 7,605,694 B2 | 10/2009 | Prost-Fin et al. | |
| 7,607,087 B2 | 10/2009 | Prados | |
| 7,683,735 B2 | 3/2010 | Shibahara | |
| 7,692,552 B2 | 4/2010 | Harrington et al. | |
| 7,710,279 B1 | 5/2010 | Fields | |
| 2001/0052893 A1 | 12/2001 | Jolly et al. | |
| 2002/0145512 A1 | 10/2002 | Sleichter, III et al. | |
| 2003/0016207 A1 * | 1/2003 | Tremblay et al. | 345/156 |
| 2004/0010346 A1 | 1/2004 | Stewart | |
| 2004/0040805 A1 | 3/2004 | Bailey | |
| 2004/0095369 A1 | 5/2004 | Takeuchi et al. | |
| 2004/0104887 A1 | 6/2004 | Tsukamoto et al. | |
| 2004/0106916 A1 | 6/2004 | Quaid et al. | |
| 2004/0117084 A1 | 6/2004 | Mercier et al. | |
| 2004/0227727 A1 | 11/2004 | Schena et al. | |
| 2004/0237669 A1 | 12/2004 | Hayward et al. | |
| 2005/0021190 A1 | 1/2005 | Worrell et al. | |
| 2005/0052415 A1 | 3/2005 | Braun et al. | |
| 2005/0073195 A1 | 4/2005 | Popilek | |
| 2005/0110754 A1 | 5/2005 | Harley et al. | |
| 2005/0110758 A1 | 5/2005 | Kyung et al. | |
| 2005/0222830 A1 * | 10/2005 | Massie et al. | 703/6 |
| 2005/0231686 A1 * | 10/2005 | Rathjen | 351/205 |
| 2006/0115347 A1 | 6/2006 | Lee | |
| 2006/0115348 A1 * | 6/2006 | Kramer | 414/5 |
| 2006/0185921 A1 | 8/2006 | Cieler et al. | |
| 2006/0192760 A1 | 8/2006 | Moore et al. | |
| 2006/0256075 A1 | 11/2006 | Anastas et al. | |
| 2007/0008083 A1 | 1/2007 | Berg et al. | |
| 2007/0091063 A1 | 4/2007 | Nakamura et al. | |
| 2007/0100523 A1 | 5/2007 | Trachte | |
| 2007/0241595 A1 | 10/2007 | Nathan et al. | |
| 2007/0265077 A1 | 11/2007 | Tom et al. | |
| 2007/0299580 A1 | 12/2007 | Lin et al. | |
| 2008/0024284 A1 | 1/2008 | Baratoff et al. | |
| 2008/0088582 A1 | 4/2008 | Prest et al. | |
| 2008/0111791 A1 | 5/2008 | Nikittin | |
| 2008/0120029 A1 | 5/2008 | Zelek et al. | |
| 2008/0192002 A1 | 8/2008 | Funch et al. | |
| 2008/0193260 A1 | 8/2008 | Yokokohji et al. | |
| 2009/0036212 A1 | 2/2009 | Provancher | |
| 2009/0160770 A1 | 6/2009 | Shahoian | |
| 2009/0179854 A1 | 7/2009 | Weber et al. | |
| 2009/0278798 A1 * | 11/2009 | Kim et al. | 345/158 |
| 2011/0032090 A1 | 2/2011 | Provancher | |

FOREIGN PATENT DOCUMENTS

| | | |
|---|---|---|
| KR | 20-0222674 | 5/2001 |
| WO | WO 03/012557 | 2/2003 |
| WO | WO 2006/115347 | 11/2006 |
| WO | WO 2009/018330 | 2/2009 |
| WO | WO 2009/129287 | 10/2009 |

OTHER PUBLICATIONS

Related Case: U.S. Appl. No. 12/699,494, filed Feb. 5, 2009, William R. Provancher.

Related Case: U.S. Appl. No. 12/949,303, filed Nov. 18, 2010, William R. Provancher.

Arai et al.; Tactile Display Which Presents Shear Deformation on Human Finger; Proceedings of the 2001 IEE International Conference on Robotics & Automation; Seoul, Korea; May 21-26, 2001.

U.S. Appl. No. 12/182,906, filed Jul. 30, 2008, William R. Provancher; office action issued Mar. 29, 2011.

Fritschi et al., "Integration of Kinesthetic and tactile Display—A Modular Design Concept," Max-Planck Institute for Biological Cybernetics, Germany, 6 pages, no date.

Micah Steele et al., Shared Control Between Human and Machine: Using a Haptic Steering Wheel to aid in Land Vehicle Guidance. University of Michigan, Ann Arbor, MI. 2001. 5 pages.

Mark Salada et al., Fingertip Haptics: A Novel Direction in Haptic Display. Northwestern University, Dept. of Mechanical Engineering and Dept. of Psychology. 2002. 10 pages.

Knut Drewing et al., First Evaluation of a Novel Tactile Display Exerting Shear Force via Lateral Displacement. ACM Transactions on Applied Perception, vol. 2, Apr. 2005, pp. 118-131.

Vincent Hayward et al., Tactile Display Device Using Distributed Lateral Skin Stretch. Dept. of Electrical Engineering Center for Intelligent Machines. McGill University. 2000. 6 pages.

Vincent Levesque et al., Experimental Evidence of Lateral Skin Strain During Tactile Exploration. Center for Intelligent Machines. Dept. of Electrical and Computer Engineering, McGill University. 2003 pp. 261-275.

Aaron Morris et al., A Robotic Walker That Provides Guidance, School of Computer Science, Carnegie Mellon University, Pittsburg PA. 2003, 6 pages.

Kanav Kahol et al., Tactile Cueing Haptic Visualization. Center for Cognitive Ubiquitous Computing. Arizona State University, Tempe Arizona, 2005. 4 pages.

Kim, Youn et al., "Hand-writing rehabilitation in the haptic virtual environment" IEEE, 2006, pp. 161-164.

Mullins, James et al., "Haptic handwriting aid for training and rehabilitation" 5 pages.

Rabin, Ely et al., "Haptic stabilization of posture: changes in arm proprioception and cutaneous feedback for different arm orientations" The American Physiologial SOciety, 1999, pp. 3541-3549.

Lam Paul, et al., "A haptic-robotic platform for upper-limb reaching stroke therapy: preliminary design and evaluation results" Journal of NeuroEngineering and Rehabilitation, May 22, 2008, 13 pages.

Rassmus-Grohn, Kirsten, "Enabling Audio-Haptics" Certec, Lund 2006, 126 pages.

Mali Uros, et al., "HIFE-haptic interface for finger exercise" IEEE, Feb. 2006, vol. 11, No. 1, pp. 93-102.

Phantom Premium 1.5/6DOF, 1.5 Highforce/6DOF and 3.0/6DOF haptic devices, 2 pages.

Cavusoglu, M. Cent et al., "Robotices for telesurgery: second generation berkely/UCSF laparoscopic telesurgical workstation and looking towards the future applications" Special Issue on Medical Robotics, Jan. 2003, vol. 30, No. 1, 11 pages.

Sallnas, Eva-Lotta, "Supporting presence in collaborative environments by haptic force feedback" ACM Transactions on Computer-Human Interaction, Dec. 2000, vol. 7, No. 4, pp. 461-476.

Sjostrom, Calle et al., "The sense of touch provides new computer interaction techniques for disable people" Technology and Disabilty 1999, pp. 45-52.

Sjostrom, Calle et al., "The sense of touch provides new computer interaction techniques for disable people," Sweden 9 pages.

Alejandro D. Dominquez-Garcia et al., Haptic Interface for Automotive Steer-by-Wire Systems. Massachusetts Institute of Technology, Laboratory for Electromagnetic and Electronic Systems. Abstract, 2006 1 page.

Roope Raisamo & Jukka Raisamo. Haptic User Interfaces 2007. Power point presentation. 10 pages.

Abbott, Jake et al., "Haptic virtual fixtures for robot-assisted manipulation" Department of Mechanical Engineering, The Johns Hopkins University, 11 pages.

MacLean, Karon, Haptics and the user interface, www.cs.ubc.ca/~maclean/publics/ 27 pages.

Phantom desktop haptic device, SensAble Technologies, Inc. 2008, 2 pages.

* cited by examiner

TACTILE CONTACT AND IMPACT DISPLAYS AND ASSOCIATED METHODS

PRIORITY

Priority is claimed of U.S. Provisional Patent Application Ser. No. 61/069,235, filed Mar. 12, 2008, which is hereby incorporated herein by reference in its entirety.

BACKGROUND

The field of haptics is the science of interfacing with users via the sense of touch by applying forces, vibrations or motions to a user. Haptic devices are increasingly becoming used to provide sensory input to a user to provide information to the user: similar to the manner in which sights and sounds provide information to the user about a surrounding environment. As an example, one commonly available (albeit simplistic) haptic device is the game stick (or "joystick") controller sold by Nintendo under the trade name "Rumble Pak." This haptic device produces vibratory motion at various times during gameplay to provide the game player, through his or her sense of touch, with information relating to a scenario of the game: e.g., when he or she fires a weapon or receives damage in the game. Haptic devices are also recognized as an integral part of virtual reality systems, which attempt to simulate, through the application of forces to a participant, situations he or she "experiences" in the virtual environment.

While haptic devices have been produced for a variety of uses, many technological hurdles remain. For example, the ability to clearly and distinctly display to users both "touch" and "non-touch" states has proved elusive.

SUMMARY OF THE INVENTION

In accordance with one embodiment, the invention provides a tactile impact display system, including a receiver, operable to receive therein a user's digit while leaving a target area of skin of the user's digit at least partially exposed and a contact pad, operable to engage the target area of the user's skin. An actuation system can be actuatably coupled to the contact pad and can be operable to move the contact pad relative to the target area of skin. A sensor can be operably coupled to the contact pad, the sensor being operable to sense a separation distance between the contact pad and the target area of the user's digit. A restraining system can be operable to substantially restrain the contact pad from moving in at least one degree of freedom relative to the receiver while allowing the contact pad to move in at least one degree of freedom relative to the receiver.

In accordance with another aspect of the invention, a tactile impact display system is provided, including a receiver, operable to receive therein a user's digit while leaving a target area of skin of the user's digit at least partially exposed and a contact pad, operable to engage the target area of the user's skin. An actuation system can be actuatably coupled to the contact pad and can be operable to move the contact pad relative to the target area of skin. A sensor can be carried by the contact pad, the sensor being operable to sense a separation distance between the contact pad and the target area of the user's digit along a movement axis. A restraining system can be operable to allow the sensor to move along the movement axis while restraining the sensor from movement in at least one other degree of freedom relative to the receiver.

In accordance with another embodiment of the invention, a method of indicating tactile impact to a user is provided, including restraining a digit of the user in a receiver while leaving a target area of skin of the user's digit at least partially exposed; sensing a separation distance between the target area of skin and a contact pad of a tactile impact display; and actuating the contact pad with an actuation system to drive the contact pad to a predetermined velocity prior to contacting the target area of skin of the user.

BRIEF DESCRIPTION OF THE DRAWINGS

Additional features and advantages of the invention will be apparent from the detailed description which follows, taken in conjunction with the accompanying drawings, which together illustrate, by way of example, features of the invention, wherein.

Figure 1A:
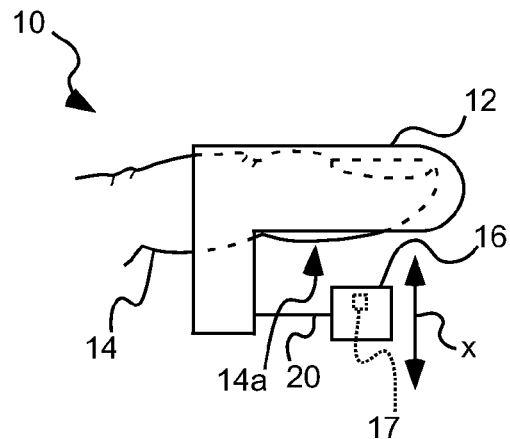
FIG. 1A is a side view of an tactile impact display system in accordance with an embodiment of the invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention.

In describing and claiming the present invention, the following terminology will be used.

As used herein, application of a contact or impact force or motion is typically done in a direction normal to a user's skin and is to be understood to be distinct from application of a shear force to the user's skin. Generally, shear forces result in a sliding motion or "skin stretch" being applied to the user's skin such that the user's skin is pulled (or tends to be pulled) in a transverse, as opposed to a normal, direction. Application of impact forces is typically and primarily normal to the skin surface. While the present systems and methods are described herein primarily in relation to their ability to impart contact or impact forces in the direction normal to users' skin, it is to be understood that the present invention can be readily incorporated into systems that apply both impact and shear forces to users' skin.

As used herein, the terms "receiver" and/or "thimble" are to be understood to refer to a structure into which at least a portion of a user's finger can be disposed to partially immobilize portions of the user's skin in the finger well to enable or enhance the application of contact or impact forces to the user's skin. Generally speaking, the thimble or receiver will include an opening or orifice through which a contact pad can contact the user's finger pad.

As used herein, relative terms, such as "upper," "lower," "upwardly," "downwardly," etc., are used to refer to various components of the systems discussed herein, and related structures with which the present systems can be utilized, as those terms would be readily understood by one of ordinary skill in the relevant art. It is to be understood that such terms in no way limit the present invention but are used to aid in describing the components of the present systems, and related structures generally, in the most straightforward manner.

As used herein, the term "substantially" refers to the complete or nearly complete extent or degree of an action, characteristic, property, state, structure, item, or result. As an arbitrary example, when an object or group of objects is/are referred to as being "substantially" symmetrical, it is to be understood that the object or objects are either completely symmetrical or are nearly completely symmetrical. The exact allowable degree of deviation from absolute completeness may in some cases depend on the specific context. However, generally speaking the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As an arbitrary example, an opening that is "substantially free of" material would either completely lack material, or so nearly completely lack material that the effect would be the same as if it completely lacked material. In other words, an opening that is "substantially free of" material may still actually contain some such material as long as there is no measurable effect as a result thereof.

INVENTION

The present invention provides systems and methods for displaying to a user tactile contact and/or impact information by way of application of contact/impact forces in a direction normal to the skin of the user. One aspect of the invention is illustrated in FIG. 1, where it can be seen that the system 10 can include a receiver 12 that is generally operable to receive therein a user's digit 14 (a finger is shown by example, it being understood that the system is operable with a variety of body inputs). The receiver 12 can be configured such that a target area 14a of skin of the user's digit is at least partially exposed while the digit in held within the receiver. A contact pad 16 can be operable to engage the target area of the user's skin.

The contact pad 16 is generally coupled to an actuation system (not shown), which is operable to move the contact pad relative to the target area of skin. A variety of actuation systems can be utilized with the present invention, as will be appreciated by one of ordinary skill in the art having possession of this disclosure. For example, the contact pad can be coupled to, and can be carried by, a robotic arm such as those manufactured and sold under the name Phantom™ by SensAble Technologies. Generally speaking, the actuation system will be capable of moving the contact pad freely about, in as many as six degrees of freedom.

A sensor 17 can be operably coupled to the contact pad 16. The sensor is operable to sense a separation distance between the contact pad and the target area 14a of the user's digit. A restraining system is operable to substantially restrain the contact pad from moving in at least one degree of freedom relative to the receiver 12 while allowing the contact pad to move in at least one degree of freedom relative to the receiver 12. In the embodiment of the invention shown in FIGS. 1A and 1B, the restraining system includes a biasing member 20 similar to a cantilever spring. The cantilever spring generally allows motion in one degree of freedom, while restricting motion in other degrees of freedom. For example, in the embodiment shown in FIGS. 1A and 1B, the cantilever spring 20 allows motion in the direction indicated as the x-axis, while substantially restricting motion in other directions (e.g., the contact pad cannot move, without permanently deforming the cantilever spring, in the left-right plane of FIGS. 1A and 1B, or into/out of the page plane of FIGS. 1A and 1B).

Thus, the present invention can be utilized to isolate movement provided by the actuation system (e.g., a Phantom™ interface system) to one or more discrete paths, relative to the receiver/thimble 12. In this manner, very simplistic sensing systems can be utilized to accurately control the making or breaking of contact or the contact velocity of the contact pad to impart impact forces to the target area 14a of the user's digit 14.

Figure 1B:
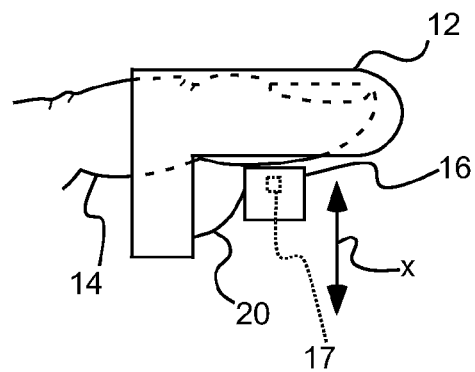
FIG. 1B is a side view of the system of claim 1A, shown with a contact pad in contact with a target area of a user's digit.

In the embodiment illustrated in FIGS. 1A and 1B, the contact pad 16 is restrained to motion in substantially a single degree of freedom. In the embodiment shown at 10a in FIGS. 2A and 2B, however, contact pad 16a is restrained to movement in substantially two degrees of freedom, show as "x" and "y" in FIG. 2B. In this embodiment, contact pad 16a includes a series of arms extending orthogonally to one another, with an attachment rod 22 extending from a nose of the contact pad for coupling with the external actuation system (e.g., the Phantom™ interface, not shown). A pair of arms extend outwardly and provide coupling locations for a pair of biasing elements (e.g., cantilever springs) 20a and 20b. A pair of sensors 19a and 19b are carried by, or can be embedded within, the contact pad.

Figure 2A:
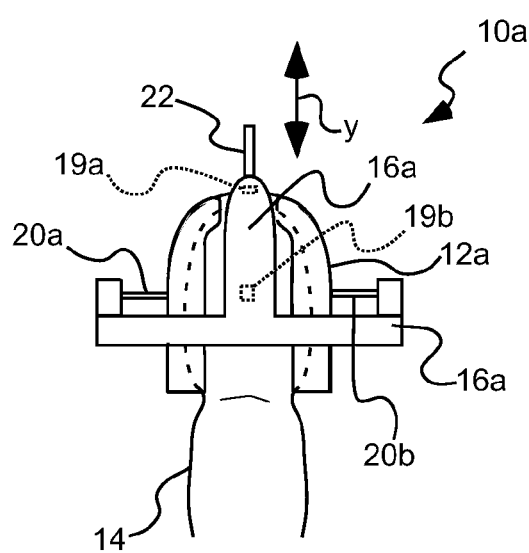
FIG. 2A is a bottom view of a tactile impact display system in accordance with an embodiment of the invention.
Figure 2B:
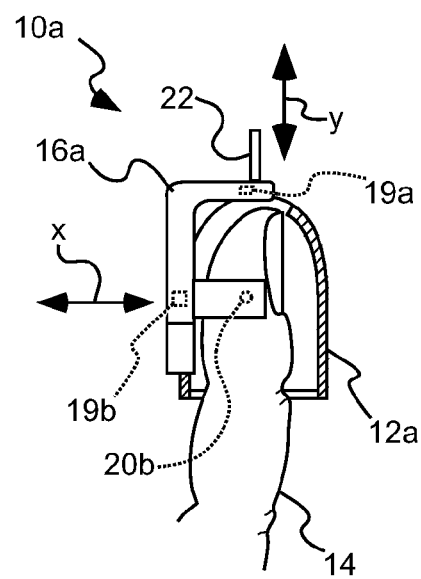
FIG. 2B is a side, partially sectioned view of the impact display system of FIG. 2A, shown with portions of a receiving thimble removed for purposes of illustration (the left-most half of the thimble is removed for clarity)

In this embodiment, the biasing elements 20a, 20b will allow the contact pad 16a to move relative to the thimble or receiver 12a in two degrees of freedom, "x" and "y." The biasing elements, however, prevent movement of the contact pad relative to the thimble in other degrees of freedom (e.g., the pad cannot move, without permanently deforming the springs, in the left-right plane of FIG. 2A). Thus, this embodiment of the invention allows for imparting of contact or impact forces to the user's digit 14 in either the fingertip location or the fingerpad location (see FIG. 2B). The sensors 19a, 19b can allow for distance (and therefore also velocity) measurements adjacent the finger in at least two distinct locations.

It will be appreciated that the sensor (17, 19a, 19b) can be carried by, and can be moveable with, its respective contact pad 16, 16a. In one aspect of the invention, the sensor can be embedded within the contact pad. While a variety of sensors can be utilized with the present invention, in one aspect, an infrared range sensor was selected over other methods of range detection (e.g. capacitive sensing) because of its ability to produce a monotonic range-current relationship and its relative insensitivity to minor changes in finger orientation. In one example, the IR range sensor chosen was a Vishay TCND5000 with an operating range of 1-14 mm and a peak operating distance at 2.5 mm. The sensor was embedded in an epoxy contact pad 16 of approximately 10 mm radius to a depth of about 4 mm. The epoxy used was 20-3302LV transparent epoxy from Epoxies, Etc. Potting the sensor beyond the depth of its peak operating distance resulted in a monotonic response with increasing sensor output as the separation distance decreased across all possible finger positions.

Figure 3:
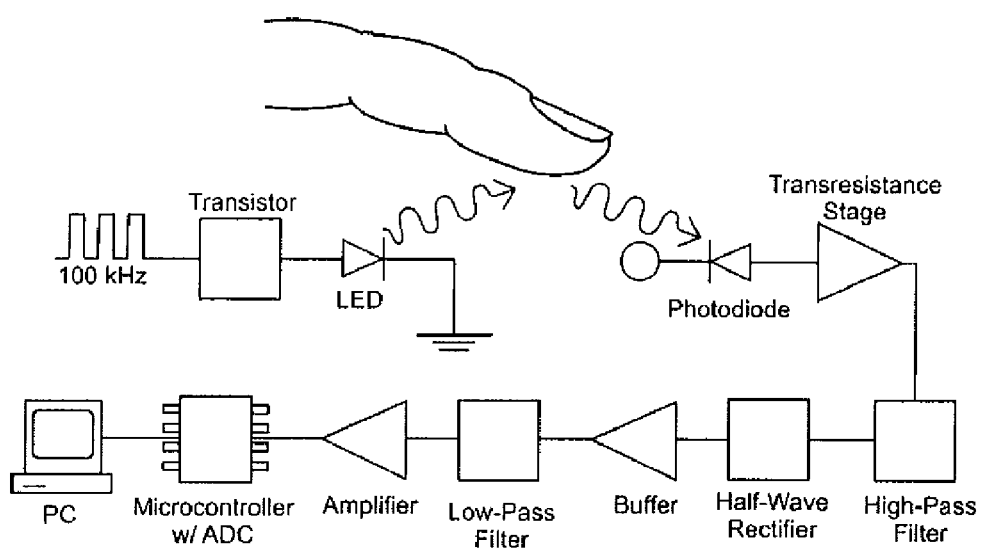
FIG. 3 is a schematic view of an exemplary range sensor signal processing system in accordance with an embodiment of the invention.

Various signal processing systems can utilized with the present systems. In one example, a signal processing circuit was constructed as shown schematically in FIG. 3. In this embodiment, the IR emitter is driven with a 100 kHz square wave so that any DC signal (ambient light) can be filtered out. A transresistance stage produces a voltage proportional to the current generated by the IR distance sensor. This voltage is filtered and amplified to provide a DC voltage that is read by a microcontroller and transmitted to the control PC in real time at 5 kHz over the PC's parallel port. Similar communication could be achieve over a computers USB or firewire port, and/or wireless serial communication. The resulting system is not immune to the effects of ambient light but is sufficiently tolerant to be used reliably indoors. Tests on users with different skin tones and finger shapes suggest that the sensor can be used with any finger.

Figure 4:
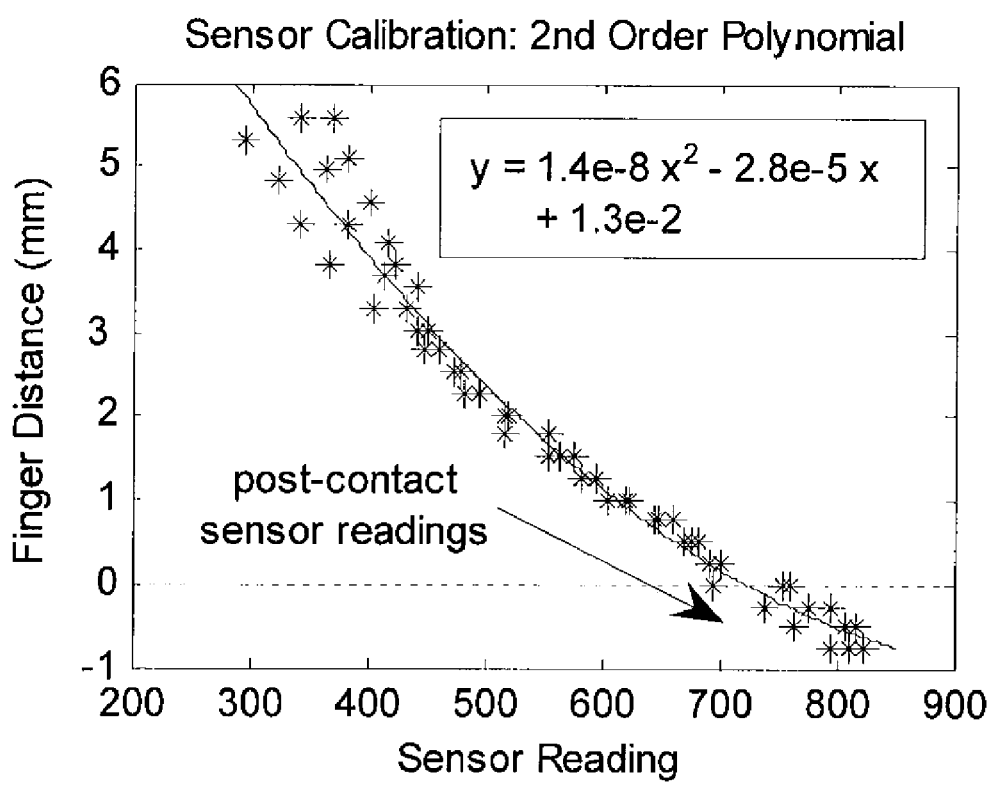
FIG. 4 illustrates exemplary data from a sensor calibration technique in accordance with an embodiment of the invention.

In the example described and shown in FIG. 4, the sensor system was calibrated by placing a height gauge against the top of the thimble and recording displacements and sensor readings. Zero distance was recorded when the contact pad could first be felt on the fingerpad. The 2nd order polynomial calibration curve is shown in FIG. 4. In order to adjust the calibration to each user, a sensor reading is taken with the finger just touching the contact pad (distance=0) and also when the contact pad is in the non-touching state (distance=3-5 mm) and the calibration curve is then shifted accordingly.

Mounted on a Phantom™ robot arm, the contact pad with embedded range sensor can allow the measurement of finger position without contact. Additional range sensors can extend the device's capability into multiple dimensions. Even a simple proportional controller can be used to maintain a constant distance between the contact pad and the finger. In effect, this provides gravitation and inertia cancelling without a complex controller; the Phantom follows the finger with only very small forces exerted by the user. While the one degree of freedom device shown in FIGS. 1A and 1B currently requires the user to maintain a fingerpad-down posture, the contact pad would maintain its distance in any orientation.

The present invention provides methods of recreating the sensations of contact and impact on a user's digit. The present systems allow models of virtual objects that are more active than can be generally experienced in virtual environments. That is, the present systems can render impact velocities that aren't necessarily equal and opposite to the current rate of travel of a user's fingertip, as would generally be experienced when contacting stationary objects. The present systems can in fact make contact at a range of arbitrary impact velocities as well as control the velocity and/or force experienced during the impact event with the fingertip.

While it has been difficult to simulate objects with large mass given the limited duration that torques can be presented by many haptic interfaces, the present invention allows varying of impact velocities to vary a user's perception of the massiveness or stiffness of an object. Accordingly, the present invention provides for variance of (or increasing of) the impact velocity of a contact pad to cause a direct increase (on behalf of the user) in perceived mass or stiffness of an object.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by any claims associated with this or related applications.

I claim:

1. A tactile contact and impact display system, comprising:
   a receiver, operable to receive therein a user's digit while leaving a target area of skin of the user's digit at least partially exposed;
   a contact pad, operable to engage the target area of the user's skin;
   an actuation system, actuatably coupled to the contact pad and being operable to move the contact pad relative to the target area of skin;
   a sensor, operably coupled to the contact pad, the sensor being operable to sense a separation distance between the contact pad and the target area of the user's digit; and
   a restraining system, operable to substantially restrain the contact pad from moving in at least one degree of freedom relative to the receiver while allowing the contact pad to move in at least one degree of freedom relative to the receiver.

2. The system of claim 1, wherein the restraining system includes at least one biasing member capable of restraining the contact pad to movement in substantially a single degree of freedom.

3. The system of claim 1, wherein the restraining system includes a pair of biasing members, the pair of biasing members being capable of collectively restraining the contact pad to movement in substantially two degrees of freedom.

4. The system of claim 1, wherein the receiver comprises a thimble that substantially encompasses the user's digit while leaving the target area of skin of the user's digit at least partially exposed.

5. The system of claim 1, wherein the sensor is carried by, and is moveable with, the contact pad.

6. The system of claim 5, wherein the sensor is embedded within the contact pad.

7. The system of claim 1, wherein the sensor comprises an infrared distance sensor.

8. The system of claim 1, wherein the actuation system comprises a robotic arm capable of moving in at least three degrees of freedom.

9. A tactile contact and impact display system, comprising:
   a receiver, operable to receive therein a user's digit while leaving a target area of skin of the user's digit at least partially exposed;
   a contact pad, operable to engage the target area of the user's skin;
   an actuation system, actuatably coupled to the contact pad and being operable to move the contact pad relative to the target area of skin;
   a sensor, carried by the contact pad, the sensor being operable to sense a separation distance between the contact pad and the target area of the user's digit along a movement axis; and
   a restraining system, operable to allow the sensor to move along the movement axis while restraining the sensor from movement in at least one other degree of freedom relative to the receiver.

10. The system of claim 9, wherein the restraining system includes a biasing member capable of restraining the contact pad to movement in substantially a single degree of freedom along the movement axis.

11. The system of claim 9, wherein the contact pad includes a pair of sensors, and wherein the restraining system includes a pair of biasing members, the pair of biasing members being capable of collectively restraining the contact pad to movement in substantially two degrees of freedom.

12. The system of claim 11, wherein each of the pair of sensors is embedded within the contact pad.

13. The system of claim 9, wherein the receiver comprises a thimble that substantially encompasses the user's digit while leaving the target area of skin of the user's digit at least partially exposed.

14. The system of claim 9, wherein the sensor comprises an infrared distance sensor.

15. The system of claim 9, wherein the actuation system comprises a robotic arm capable of moving in at least three degrees of freedom.

16. A method of indicating tactile contact and/or impact to a user, comprising:
    restraining a digit of the user in a receiver while leaving a target area of skin of the user's digit at least partially exposed;
    sensing a separation distance between the target area of skin and a contact pad of a tactile impact display;
    actuating the contact pad with an actuation system to drive the contact pad to a predetermined velocity prior to contacting the target area of skin of the user.

17. The method of claim 16, further comprising sensing a separation distance between the target area of skin and the contact pad while the contact pad is driven with the actuation system; and
    modifying a velocity at which the contact pad is driven based on the separation distance sensed.

18. The method of claim 16, wherein sensing a separation distance between the target area of skin and the contact pad of the tactile impact display utilizes a distance sensor carried by and moveable with the contact pad.

19. The method of claim 18, wherein the distance sensor comprises an infrared sensor.

20. The method of claim 16, wherein actuating the contact pad with an actuation system to drive the contact pad includes actuating the contact pad while the contact pad is restrained to a predetermined path by at least one biasing member.

\* \* \* \* \*